United States Patent Office 3,329,483
Patented July 4, 1967

3,329,483
FLUIDIZED BED PROCESS FOR PRODUCING PIGMENTARY TITANIUM DIOXIDE WITH REDUCED ACCRETION THEREIN
Arthur Wallace Evans, Nunthorpe, Middlesbrough, Kenneth Arkless, Eaglescliffe, Durham, and John Peacock, Nunthorpe, Middlesbrough, England, assignors to British Titan Products Company Limited, Billingham, England, a British company
No Drawing. Filed Jan. 25, 1963, Ser. No. 254,003
Claims priority, application Great Britain, Jan. 30, 1962, 3,527/62
10 Claims. (Cl. 23—202)

The present invention relates to an improved process for the production of titanium dioxide by the vapour phase oxidation of a titanium tetrahalide in a heated fluidised bed.

The oxidization of titanium tetrahalides, particularly titanium tetrachloride, by an oxidising gas in a fluidised bed has been previously described, for example in our British patent specification No. 761,770.

Considerable difficulty has been experienced in producing titanium dioxide on a commercial scale by such a process, owing to the retention of some of the titanium dioxide produced on the bed particles in the form of a hard accretion. The amount of titanium dioxide so retained may be so great, for example from 20 to 50% of the total amount produced, that the process is uneconomic. The problem is aggravated because the titanium dioxide is retained on the particles in such a form that the greater part cannot normally be recovered for use as a high quality pigment. This material is generally only of value in the production of vitreous enamels and in similar processes where the particle size requirement is different.

This difficulty has been overcome to some extent by our co-pending application No. 26,192/60, which provides a process wherein the accretion on the bed particles is in such a form that pigmentary material can be recovered from the bed particles, for example by grinding.

It is an object of the present invention to provide a fluidised bed process for the vapour phase oxidation of a titanium tetrahalide wherein the amount of titanium dioxide which is retained on the particulate material of the bed is less than in the normal prior processes.

Accordingly, the present invention is a process comprising reacting a titanium tetrahalide and an oxygenating gas in a hot fluidised bed of inert particulate material, in the presence of a source of the element potassium, rubidium and/or caesium, and thereafter recovering titanium dioxide from above the bed.

If one adds the source of potassium, rubidium and/or caesium to the bed batchwise, sufficient of the source may be added to the bed to give a concentration by weight (estimated as the oxide of the element) of up to 5%, preferably of 0.1 to 1%, based on the weight of the fluidised bed. When continuous additions of the source are made to the bed it is preferred to base the amount of the compound added on the weight of titanium dioxide produced from the titanium tetrahalide oxidised in the bed and it is preferred to add sufficient of the source (estimated as the oxide) to give a theoretical concentration of up to 2%, preferably of 0.1 to 1%, based on such weight of titanium dioxide.

However, it has also been found that the amount of the source of potassium, rubidium and/or caesium required may be reduced if a source of one or more of the elements sodium, lithium and elements of Group IIa and IIb is also added to the bed. Elements of Group IIa and IIb which may be specifically mentioned are magnesium, calcium, strontium, barium, zinc and cadmium.

There is some evidence that the synergistic effect of these elements is better shown with Group IIa or IIb elements of smaller atomic radius, for example magnesium, calcium or zinc.

In the presence of a source of sodium, lithium, magnesium, calcium, strontium, barium, zinc or cadmium, preferably in an amount (estimated as the oxide) by weight in the range of 0.1% to 1% (on the bed weight in a batchwise addition of the bed material and on the titanium dioxide produced in the bed when continuous additions of bed material are made), the quantity of the source of potassium, rubidium and/or caesium may be reduced, for example to an amount in the range 0.01% to 0.05%, although greater or lesser amounts may be used as desired.

The source or sources of the element or elements (herein called "the source") is or are generally most conveniently a salt or salts or a hydroxide or hydroxides of the element or elements, and commonly available salts are the chlorides, sulphates, phosphates, carbonates and nitrates. Sometimes a compound may be too volatile (e.g. zinc chloride) and it may be preferable to use a less volatile compound (e.g. zinc sulphate).

Generally, the preferred element is potassium. In this case, it is preferable to use a salt, especially a chloride, as the source of the element. Mixtures of salts may of course be used.

The source may be introduced into the bed as a solid or as a solution, for example as an aqueous solution. One method is to slurry the particulate bed material with a solution of the compound and to dry the resulting slurry before using the material in the bed. Alternatively, the source may be in a form suitable for use as a proportion of the particulate material of the bed. An example is potassium aluminium silicate. It is also possible to introduce the source into the reaction zone finely divided solid or liquid, e.g. atomised, form and the source in this form may if desired be introduced with one or other of the main reactants.

The use of the metal itself as source is contemplated. Thus the metal may in a suitable case be introduced as a vapour into the reaction zone.

Where the process is carried out with the continuous or intermittent removal of bed particles enlarged by accretion and replacement of these by smaller particles, the latter can be mixed with the required amount of the source before introduction into the bed, for example by the above-described method of slurrying and drying.

It may be noted that some sources may have properties such that, at the temperature of the process, they will not remain uniformly distributed throughout the bed.

Potassium compounds have been found to give particularly beneficial results with regard to the type of pigment produced. The potassium compound may be in solids or other form. Typical usable salts include potassium chloride, potassium sulphate, potassium nitrate or potassium acetate or a mixture of these compounds. Other contemplated potassium compounds include organic potassium compounds where the potassium is directly bonded to a carbon atom of an organic radical. Examples of organic compounds are potassium alkyls, such as ethyl potassium and nonyl potassium; aromatic potassium compounds such as potassium benzene (phenyl potassium), 1,4-di-potassium phenylene and 1,7-di-potassium anthracene; aralkyl potassium compounds such as benzyl potassium; or alkaryl potassium compounds such as di-potassium durene (1,4-di-potassium-2,3,5,6-tetramethyl benzene) and xylyl potassium. The potassium salts may be separately fed to the reaction zone by the introduction of another stream. Alternatively, the salts may be added to the titanium tetrachloride stream. The organic potassium compounds are most conveniently added to the titanium tetrachloride vapour stream when the stream has a temperature below 600° C., preferably below 500° C.

The potassium compounds may be added to the combustion stream by first suspending the compound in an air stream or in an oxygen stream by atomising the potassium compound therein. The potassium compound suspended in the stream will thereby be carried into the reaction zone by feeding the stream into the combustion zone.

These potassium compounds are found to act similarly to the silicon compounds in that they tend to repress the particle size of the pigmentary titanium dioxide produced during the reaction. These compounds differ from the silicon compounds in so far as they appear not to favour the production of an anatase pigment. Thus, it may be employed alone or in conjunction with the aluminium compounds or may be employed in conjunction with the silicon compounds where the aluminum compound is also concurrently added.

Certain other metals or metal compounds may be beneficially employed in conjunction with the aforementioned potassium compounds, for example sodium, lithium and elements of Group IIa and IIb having an atomic weight below 138 of the Periodic Table of the elements found at pages 58 and 59 of Lange's Handbook of Chemistry 6th edition (1946), published by Handbook Publishers Incorporated, Sandusky, Ohio. Of these metals magnesium, calcium and zinc are preferred. These metals may be employed in the metallic vapour state or as the salts, for example as the chloride or phosphate or acetate or sulphate or oxylate or they may be directly bonded to a carbon of an organic compound as described for the aforementioned potassium compounds.

The titanium tetrahalide is preferably titanium tetrachloride, and it is preferably introduced into the bed as a vapour. The tetrafluoride is unsuitable for use in the present invention and the term "tetrahalide" as used herein does not include the tetrafluoride.

The oxygenating gas must of course be one which oxidises the titanium tetrahalide to titanium dioxide. The oxygenating gas is preferably oxygen, which may be in admixture with inert gas. Thus, one may use air or oxygen-enriched air, if desired.

The bed is normally maintained in the fluidised state by passing the reactants into the bed at suitable flow rates. If desired, however, other gases can be introduced into the bed to assist fluidisation. When the oxygenating gas is air, the nitrogen in the air may act as such other gas. The introduction of such gases may, however, cause difficulty in the recovery of the halogen, for example chlorine, liberated during the oxidation.

As is known in the art, the fluidised bed should normally be maintained at a temperature in the range of 800° C. to 1200° C., preferably 900° C. to 1100° C.

Where the process is carried out on a large scale, for example in a well-lagged fluidised bed having a diameter greater than about 18 inches, the heat losses may be so small that the heat of reaction from the oxidation of the titanium tetrahalide will maintain the desired bed temperature, i.e. the process may be autothermal. When the heat losses are too great, e.g. when the process is carried out on a smaller scale, it may be necessary to supply heat from an outside source. This may be provided by electrical heating, by pre-heating one or more of the gases introduced into the bed, or by burning a fuel, for example carbon monoxide, in the bed. In the latter case sufficient oxygenating gas must be introduced to burn the fuel in addition to oxidising the titanium tetrahalide to titanium dioxide.

The particulate material forming the fluidised bed may be any material of suitable particle size which does not adversely affect the oxidation of the titanium tetrahalide. A preferred particle size in 50 to 2,000 microns, particularly 100 to 1,000 microns. Materials such as silica, zircon, alumina, titanium dioxide or mixtures thereof may be used, or alternatively a material or a proportion of material may be used in the bed which contains the source of the present invention, for example a material containing potassium aluminium silicate.

In addition to the titanium tetrahalide, the oxygenating gas and the source, minor proportions of other substances may be introduced into the bed during reaction; such other substances include rutilising agents, such as aluminium halide, zirconium tetrahalide and water vapour, and other titanium dioxide crystal-modifying agents, such as silicon halide (e.g. silicon tetrachloride) antimony halide (e.g. antimony pentachloride) and phosphorous halide (e.g. phosphorous trichloride). In particular, it may be advantageous to introduce a small quantity of an aluminium halide and a silicon halide, as in the process of our co-pending application No. 26,192/60. In that process, the aluminium halide (for example aluminium trichloride) is introduced separately from the titanium tetrahalide, and the silicon halide (for example silicon tetrachloride) is introduced separately from the aluminium halide; by this method any accretion which does form on the bed particles is made softer and can be recovered as pigmentary material by grinding the particulate material of the bed.

The titanium dioxide produced and entrained in the effluent gases may be recovered from above the fluidised bed in a known manner; for example, the effluent gases may be passed through a separator such as a cyclone to remove larger particles, and pigmentary titanium dioxide may then be filtered off and recovered. The gaseous halogen liberated, for example chlorine, may be separated from the other gaseous products by liquefaction and may be used to produce more titanium tetrahalide.

The amount of titanium dioxide retained on the bed particles as an accretion is normally reduced by the process of the present invention. The titanium dioxide produced generally also has a more uniform particle size compared with the product formed in the absence of the alkali metal or alkaline earth metal compounds.

*Example 1*

This was a control example not using the process of the invention.

A 3" internal diameter silica tube 48" in length was set up vertically and surrounded by an electric furnace. The tube was sealed at the bottom with a silica disc through which passed two inverted U-shaped silica inlet tubes.

One of the inlet tubes was connected to a source of aluminium trichloride vapour and oxygen and the other was connected to a source of titanium tetrachloride and silicon tetrachloride vapour.

At the top of the silica tube provision was made to collect the titanium dioxide produced and to pass the effluent gases to a scrubbing tower. A sheathed thermocouple was introduced through the top of the silica tube and projected into the fluidised bed.

Dense titanium dioxide particles (1740 gr.) of particle size −44 +72 (British Standard Sieve) were introduced into the silica tube to form a static bed. The electric furnace was then switched on and the bed was fluidised with air until it reached a temperature of 1050° C. The flow of air was then stopped, and oxygen was introduced through one inlet tube at a rate of 18 litres per minute (measured at room temperature). The oxygen contained sufficient aluminium trichloride vapour to give 3% of alumina (by weight of the titanium dioxide produced).

Titanium tetrachloride vapour pre-heated to a temperature of 200° C. was introduced through the other inlet at a rate equivalent to 55 ml./min. of liquid titanium tetrachloride. The titanium tetrachloride vapour contained 0.3% of silicon tetrachloride vapour (by weight of the liquid titanium tetrachloride). The process was continued for 30 mins.

The pigmentary titanium dioxide obtained from above the bed was of excellent pigmentary quality and had a rutile content of 98.5%. 40% of the titanium tetrachloride admitted to the bed was retained on the bed particles as titanium dioxide accretion.

When the bed material was removed and subjected to wet milling the amount of titanium dioxide retained on the bed after milling was 11.3% and the material ground off the bed particles was of good pigmentary quality having a rutile content of 98.5%.

*Example 2*

The process described in Example 1 was repeated, but before the bed material was placed in the silica tube it was slurried with an aqueous solution containing 17.5 gr. of potassium chloride, (equivalent to 1% potassium chloride by weight of the bed material). The slurry was dried at 120° C. and the material was then placed in the silica tube.

The titanium dioxide collected from above the bed had excellent pigmentary properties. It was of good colour and tinting strength and had a very uniform particle size. It had a rutile content of 97.6%.

The bed material was found to have retained only 26.3% of the titanium tetrachloride as an accretion of titanium dioxide on the bed particles. After wet milling the bed material, only 6.1% of the titanium tetrachloride was still retained as titanium dioxide. The recovered pigment had good pigmentary properties and a rutile content of 97.9%.

*Example 3*

The process described in Example 2 was repeated but the bed material was treated with an aqueous solution containing 0.875 gram of potassium chloride (equivalent to 0.05% by weight of potassium chloride on the bed material).

The titanium dioxide collected from above the bed had excellent pigmentary properties. It was of good colour and tinting strength with a rutile content of 98.2%.

The bed material was found to have retained 39% (by weight of titanium dioxide) of the titanium tetrachloride passed through the bed as an accretion on the bed particles. After wet milling the bed material only 12.7% of the titanium tetrachloride (as TiO$_2$) was retained on the bed particles. The recovered pigment had good pigmentary properties and a rutile content of 98.7%.

*Example 4*

The process described in Example 2 was repeated using additions to the bed of 0.05% of potassium chloride and 1% of the compounds shown in the following table.

The percentage of the titanium tetrachloride (as titanium dioxide) which was retained as an accretion on the bed particles is shown in the table below (before and after milling).

| Compound added to the fluidised bed (1% by weight of bed weight) | Before Milling | After Milling |
|---|---|---|
| Sodium Chloride | 30 | 9 |
| Lithium Chloride | 37 | 11 |
| Calcium Chloride | 34 | 11 |
| Magnesium Chloride | 29 | 8 |
| Zinc Sulphate | 29 | 7 |
| Cadmium Chloride | 30 | 6 |

*Example 5*

The process described in Example 2 was repeated using 0.5% of caesium chloride in place of the potassium chloride.

Results similar to those of Example 2 were obtained.

*Example 6*

The process described in Example 2 was repeated using an addition of 1.0% of rubidium chloride in place of the potassium chloride.

Results similar to those of Example 2 were obtained.

*Example 7*

The process described in Example 4 was repeated using 0.05% of caesium chloride in place of the potassium chloride.

Results similar to those of Example 4 were obtained.

*Example 8*

The process described in Example 4 was repeated using 0.05% of rubidium chloride in place of the potassium chloride.

Results similar to those of Example 4 were obtained.

What is claimed is:

1. In a fluidized bed process for producing pigmentary titanium dioxide wherein titanium tetrahalide and an oxygenating gas are introduced into a fluidized bed of inert particulate material in which the particles are in the size range of 50 to 2000 microns and the bed temperature is at least 800° C., and said tetrahalide and oxygenating gas are intermingled and reacted in the vapor phase in said fluidized bed, the improvement which comprises providing in said fluidized bed at least one element selected from the group consisting of potassium, rubidium, and caesium and effecting said tetrahalide-oxygenating gas reaction in the intimate presence of said element to reduce accretion of produced titanium dioxide on said bed of inert particles.

2. An improved process in accordance with claim 1 wherein said selected element is introduced into said fluidized bed in the form of a compound selected from the group consisting of the salts and hydroxides of potassium, rubidium and caesium.

3. A process in accordance with claim 1 wherein said titanium tetrahalide is titanium tetrachloride.

4. A process in accordance with claim 1 wherein there is included with said selected element an additional element selected from the group consisting of lithium, sodium, Group IIa, Group IIb elements and mixtures thereof and where in said tetrahalide-oxygenating gas reaction is effected in the intimate presence of all of the elements so selected.

5. A process in accordance with claim 1 wherein there is provided in said fluidized bed a mixture of
   (a) at least one element selected from the group consisting of potassium, rubidium and caesium; and
   (b) at least one element is selected from the group consisting of lithium, sodium, magnesium, calcium, strontium, barium, zinc and cadmium and wherein said tetrahalide-oxygenating gas reaction is effected in the intimate presence of said mixture.

6. A process in accordance with claim 5 wherein said titanium tetrahalide is titanium tetrachloride.

7. In a fluidized bed process for producing pigmentary titanium dioxide wherein titanium tetrachloride and an oxygenating gas are introduced into a fluidized bed of inert particulate material in which the particles are in the size range of 50 to 2000 microns and the bed temperature is at least 800° C., and said tetrachloride and oxygenating gas are intermingled and reacted in the vapor phase in said fluidized bed, the improvement which comprises providing in said fluidized bed a mixture of at least 0.01% by weight of an element selected from the group consisting of potassium, rubidium and caesium calculated as the oxide on the amount of titanium dioxide produced from the titanium tetrachloride oxidized in the bed and at least one element selected from the group consisting of sodium, lithium, magnesium, calcium and zinc, and effecting said tetrachloride-oxygenating gas reaction in the intimate presence of both said potassium and said selected element to reduce accretion of produced titanium dioxide on said bed of particles.

8. Process of claim 2 wherein the selected compound is a salt of potassium.

9. Process of claim 8 wherein the salt of potassium is potassium chloride.

10. The process of claim 1 wherein the element consisting of the class potassium, rubidium, caesium and mixres thereof is provided in an amount of at least 0.01% by weight (estimated as the oxide) upon the amount of titanium dioxide produced from the titanium tetrahalide oxidised in the bed.

References Cited

UNITED STATES PATENTS

| | | | |
|---|---|---|---|
| 1,885,934 | 11/1932 | Mayer. | |
| 2,347,496 | 4/1944 | Muskat et al. | 106—300 |
| 2,798,819 | 7/1957 | Schaumann | 23—202 |
| 3,105,742 | 10/1963 | Allen et al. | 23—202 |
| 3,148,027 | 9/1964 | Richmond | 23—202 |
| 3,208,866 | 9/1965 | Lewis et al. | 106—300 |

OSCAR R. VERTIZ, *Primary Examiner.*

MAURICE A. BRINDISI, *Examiner.*

E. STERN, *Assistant Examiner.*